United States Patent [19]

Hujii et al.

[11] 3,923,940
[45] Dec. 2, 1975

[54] PROCESS FOR THE MANUFACTURE OF CERAMIC HONEYCOMB STRUCTURES

[75] Inventors: Tooru Hujii, Yokkaichi; Eiichi Hisada, Nagoya, both of Japan

[73] Assignee: Nippon Toki Kabushiki Kaisha, Nagoya, Japan

[22] Filed: Mar. 28, 1973

[21] Appl. No.: 345,727

Related U.S. Application Data

[63] Continuation-in-part of Ser. No. 234,914, March 15, 1972, abandoned.

[30] Foreign Application Priority Data

Apr. 12, 1971  Japan.............................. 46-22911

[52] U.S. Cl. ...................... 264/59; 264/62; 264/63; 264/66; 264/67; 264/133; 264/135; 264/136; 264/316; 264/317; 264/336; 264/338
[51] Int. Cl.² ......................................... C04B 33/32
[58] Field of Search .......... 264/59, 317, 58, 60, 62, 264/63, 66, 67, 133, 134, 135, 136, 316, 336, 338

[56] References Cited
UNITED STATES PATENTS

| | | | |
|---|---|---|---|
| 2,506,244 | 5/1950 | Stopka................................. | 264/59 |
| 2,554,327 | 5/1951 | Gravley............................... | 264/59 |
| 3,112,184 | 11/1963 | Hollenbach........................ | 264/63 X |
| 3,251,403 | 5/1966 | Smith.................................. | 264/59 X |
| 3,370,348 | 2/1968 | Brownlow........................... | 264/317 |
| 3,437,723 | 4/1969 | Habermann ....................... | 264/59 X |
| 3,502,596 | 3/1970 | Sowards............................. | 264/59 X |
| 3,533,753 | 10/1970 | Berger ................................ | 264/59 X |
| 3,582,301 | 6/1971 | Andrysiak........................... | 264/59 X |

*Primary Examiner*—Robert F. White
*Assistant Examiner*—Thomas P. Pavelko
*Attorney, Agent, or Firm*—Frank J. Jordan

[57] ABSTRACT

A process for the manufacture of a ceramic honeycomb structure which comprises the steps of coating at least one kind of a ceramics-forming material on combustible or non-combustible rods or tubes which have been wrapped with water-absorbent paper, arranging or bundling the coated rods or tubes so that they together form a desired honeycomb structure blank, removing the base rods or tubes from the blank if they are non-combustible, drying the blank and then firing the dried blank to manufacture the ceramic honeycomb structure. In one embodiment, said coated rods or tubes are dried and freed of the base rods or tubes to obtain tubular coatings which are then further coated with a ceramics-forming material. The further coated tubular coatings are formed to a desired honeycomb structure blank which is dried and then fired to obtain the ceramic honeycomb structure.

12 Claims, 7 Drawing Figures

PROCESS FOR THE MANUFACTURE OF CERAMIC HONEYCOMB STRUCTURES

This invention relates to a process for manufacturing ceramic honeycomb structures, especially thin-walled ones, having a large surface to volume ratio. More particularly, it relates to a process for the manufacture of a ceramic honeycomb structure which comprises the steps of coating at least one kind of a ceramics-forming material on combustible or non-combustible rods or tubes, arranging or bundling the coated rods or tubes so that they together form a desired honeycomb structure blank, removing the base rods or tubes from the blank if they are non-combustible, drying the blank and then firing the dried blank to manufacture the ceramic honeycomb structure. In one embodiment, said coated rods or tubes are dried and freed of the base rods or tubes to obtain tubular coatings which are then further coated with a ceramics-forming material. The further coated tubular coatings are formed to a desired honeycomb structure blank which is dried and then fired to obtain the ceramic honeycomb structure.

The ceramic honeycomb structures according to this invention are solid structures composed of thin-walled ceramic cells which are arranged in parallel and bonded with each other, in which structures the longitudinal axes of the cells are substantially perpendicular to two parallel flat surfaces of the structures. The cross-section of the cells may be polygonal, preferably hexagonal, in shape, otherwise it may assume circular, elliptic or other shapes.

An object of this invention is to provide any kinds of ceramic honeycomb structures whose overall shape, component material, cell size, cell shape and other features are such as to answer a particular purpose for which they are to be used.

Another object of this invention is to provide a process for manufacturing any ceramic honeycomb structures having extremely thin cell walls with ease and at a lower cost. The process makes it possible to easily manufacture ceramic honeycomb structures having cells the wall thickness of which is extremely thin.

The conventional known processes for the manufacture of thin-walled ceramic honeycomb structures may be divided into two broad classes A and B; class A including processes comprising the steps of making flexible sheets of a ceramics-making material, forming the sheets to specifically shaped sheets such as corrugated ones, arranging the thus specifically shaped sheets so that they together form a honeycomb structure blank and then firing the blank to obtain an integral thin-walled ceramic honeycomb structure, while class B including processes comprising the steps of forming a sheet (for example, aluminum foil, paper or the like) as a nuclear or core material to such one as conforms to the shape of a desired honeycomb structure, coating both the sides of the thus-formed sheet with a ceramics-forming material and then firing the coated sheet to obtain the desired thin-walled ceramic honeycomb structure.

According to the processes of class A, a solid thin-walled ceramic honeycomb structure is produced from specifically shaped single sheets of a ceramics-making material by arranging them so that they together form a honeycomb structure blank and then firing the blank. Thus, these processes do not practically provide wide variation in cell shape in the manufacture of ceramic honeycomb structures as compared with the process of this invention because the cell shape of the ceramic honeycomb structures to be obtained is determined depending on the shape of the specifically shaped ceramics-making sheets used. The original sheets will possibly crack and/or break in the steps of forming them to specifically shaped ones and/or arranging the shaped sheets to form a green honeycomb structure or a honeycomb structure blank thereof for subsequent firing if they are made too thin. Thus, they are required to be thick for practical use as compared with those which may be used in the practice of this invention.

According to the processes of class B, on the other hand, a sheet material which is the nucleus or core of a desired honeycomb structure being obtained, is necessary to form to the same shape as that of the desired honeycomb structure. Therefore, these processes also do not practically provide wide variation in cell shape. Since said sheet material thus formed is then coated with a ceramics-making material to obtain a blank for the desired honeycomb structure, the honeycomb structure manufactured by firing the blank is necessarily large in cell wall thickness as compared with that manufactured by the process of this invention. Further, such conventional processes for the manufacture of ceramic honeycomb structures using paper, aluminum sheet or the like as the nucleus or core for the honeycomb structures are disadvantageous in that they are complicated and consequentially uneconomical.

It has been found by the inventors, after their studies made in an attempt to make a thin-walled, ceramic honeycomb structure having a desired shape, that such structure can be produced easily and economically be preparing rods or tubes having a desired cross-sectional shape (which will provide a desired cell shape of the structure) and being made of a combustible material, coating the thus-prepared rods or tubes with a slurry of a desired ceramics-forming material in a desired thickness, arranging at least two of the coated rods or tubes so that they form a honeycomb structure blank (a mass having substantially the same shape as the honeycomb structure to be obtained) and then firing the blank to produce, after cooling, the honeycomb structure easily and economically. More particularly, the honeycomb structure according to this invention can be manufactured by preparing rods or tubes having a desired cross-sectional shape and being made of a combustible material such as plastics or paper, coating the rods or tubes at least one time with a ceramics-forming material in the form of slurry, arranging at least two of the coated rods or tubes so that they contact with each other at the surface of the coating formed thereon to form a honeycomb structure blank which is a honeycomb-like mass having substantially the same shape as a desired honeycomb structure, drying the thus-formed blank and then firing in an oxidizing atmosphere such as air the dried blank at the optimum sintering temperature for the ceramics-forming material thereby removing the combustible rods or tubes by burning, to obtain the desired honeycomb structure. The above-mentioned coating and arranging steps may be substituted by those of coating the rods or tubes at least one time with the slurried ceramics-forming material, drying each of the coated rods or tubes separately, further coating the dried rods or tubes with the slurried ceramics-forming material and arranging, before drying of the further coated ceramics-forming material, at least two of the further coated rods or tubes in the same manner as above. In the practice of this invention, incombustible rods or tubes (such as metallic ones) may also be used in substitution for the combustible ones. If such incombustible rods or tubes are used, a honeycomb-like mass formed of such coated rods or tubes as above must be fired after removal of the base rods or tubes from the mass, to produce the same honeycomb structure as above.

The terms "ceramics-forming material" herein used are defined to include a sinter-forming material such as metals and metallic compounds. Ceramics-forming materials which may be used, include aluminosilicate, alkaline earth metalsilicates, sillimanite, magnesium silicate, magnesia, zircon, zirconia, petalite, spodumene, cordierite, corundum, mullite, aluminum phosphate, spinel, carborundum, glass-ceramics and the like. These materials are considered to have a specific gravity of about 2.5 to about 4.0. Ceramics-forming materials containing cordierite, spodumene or the like having a low thermal expansion coefficient, are preferable for use as such in the manufacture of honeycomb structures which are intended to be used as a carrier for catalyst or packing material for heat exchange in an atmosphere which is at a relatively high temperature or has a temperature gradient.

In the accompanying drawings.

Figure 5:
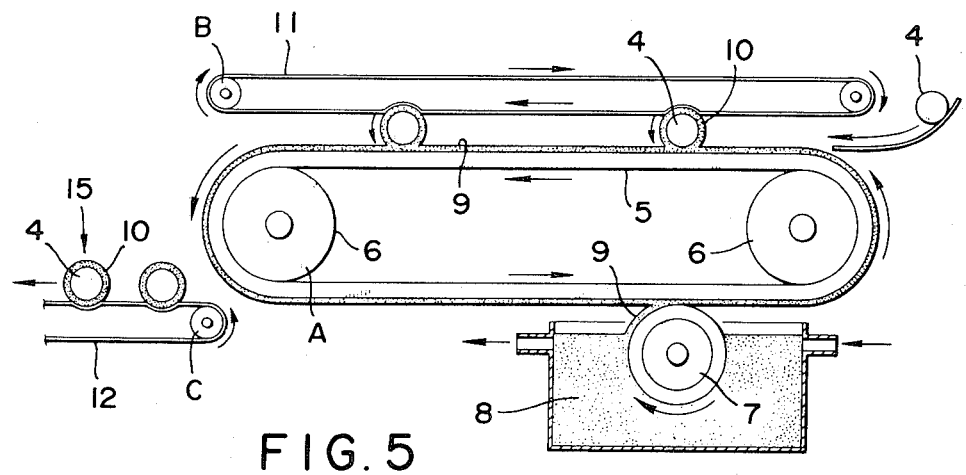
Figure 6:
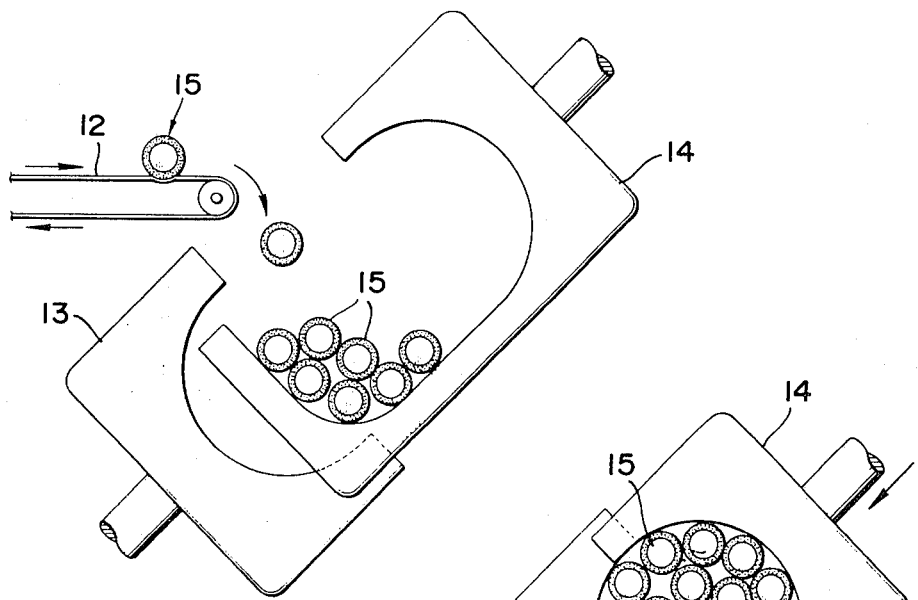
Figure 7:
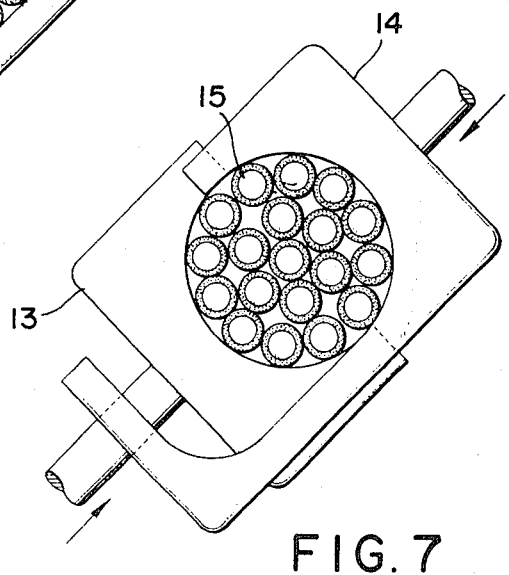

FIG. 5 diagrammatically shows an illustrative coating machine which may be used in the practice of this invention;

FIG. 6 is a diagrammatic view of an illustrative arranging or bundling machine wherein coated rods or tubes are being charged; and FIG. 7 is a diagrammatic view of the arranging machine of FIG. 6 wherein the coated rods have been bundled.

Referring now to the figures, the process of this invention will be explained in more detail.

Figure 1:
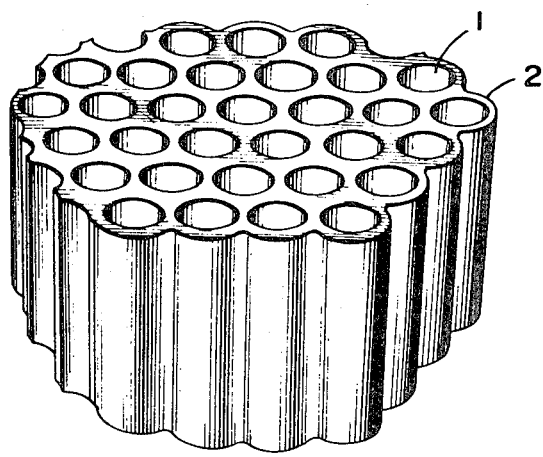
FIG. 1 is a perspective view of a ceramic honeycomb structure of this invention consisting of cells which are circular in cross-section or cell shape.
Figure 2:
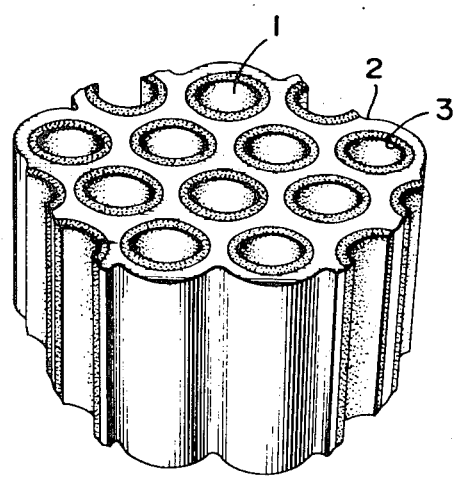
FIG. 2 is a perspective view of a ceramic honeycomb structure consisting of cells which are circular in cross-section and have a two-layer wall.
Figure 3:
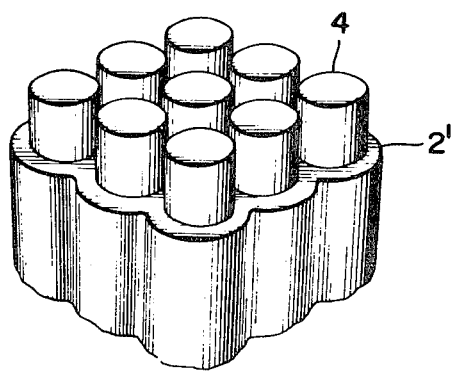
FIG. 3 is a perspective view of a honeycomb structure blank which is not fired yet and contains plastics-made rods used as the core material.
Figure 4:
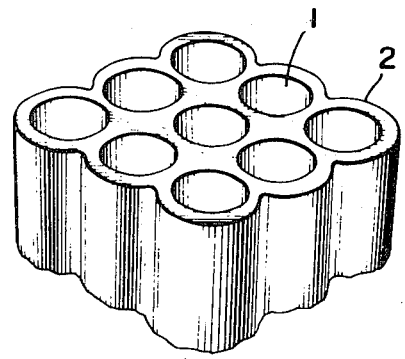
FIG. 4 is a perspective view of a ceramic honeycomb structure produced by firing the honeycomb structure blank of FIG. 3 thereby burning up the plastics-made rods and making the structure blank a ceramic structure.

A slurried ceramics-forming material is firstly prepared by incorporating at least one of said ceramics-forming materials with, as required, a flux, an organic stickifier (sticking agent) and water in such amounts that the resulting mixture forms a slurry having suitable properties as in the material. The flux may be feldspar, talc, limestone or the like, and the organic sticking agent may be CMC, polyvinyl acetate, polyvinyl alcohol (PVA) or the like. Other suitable materials may also be added to the slurry as required. The slurry is coated in a desired thickness on the surface of tubes or rods 4 having substantially the same shape as the cell shape of a honeycomb structure of FIG. 4 to be obtained and being made of a combustible material such as plastics (for example, polyvinyl chloride, polypropylene, polyethylene or polystyrene), wood or paper. If rods or tubes being used as a core material are difficult to get wetted with the slurry, they should be each covered with, for example, tissue paper by winding it doubly or trebly around each of them, thereby making them capable of being coated with said slurry. Any coating techniques may be used for slurry coating according to this invention if they can achieve uniform coating around such rods or tubes. Such coating may be carried out usually by any of immersion, spraying, brushing and like methods. An example of coating machine which may conveniently be used in the practice of this invention, is shown in FIG. 5. Such coating machine makes it possible to effect uniform coating on a mass production scale. As shown in FIG. 5 tubes or rods designated at 4 and a slurry of ceramics-forming material is indicated at 9. Two string-like belts 11, which are spaced from each other, are provided suitably above the coating belt 5. The same two string-like belts 12 as above are used to carry the slurry-coated rods or tubes 15 to a drying chamber (not shown) or bundling machine as shown in FIG. 5.

When the belts 5, 11 and 12 are rotated in the directions of arrow symbols by rotating driving rolls A, B and C in the directions of arrow symbols, respectively, a coater roll 7 is rotated with the slurry attached to the surface thereof in a slurry tank while contacting with the belt 5 thereby to transfer the slurry to the surface of the belt 5. After the surface of the belt 5 is suitably coated with the slurry, the tubes or rods 4 are passed one by one onto the slurry-coated belt and they are rolled in the direction of arrow symbol between the belts 5 and 11 to transfer the coated slurry 9 to the surface of the cores 4 thereby forming thereon a coating 10 of the slurry 9. The string-like belts 11 move at a velocity approximately twice that of the belt 5. The thickness of the coating 10 can be controlled by varying the slurry in water content, for instance. The thus-coated tubes or rods 15 are then dropped onto the rotating belt 12 and carried thereby to the drying chamber (not shown) or bundling machine with dies 13 and 14 in the open state as shown in FIG. 6. After the bundling machine is charged with a predetermined number of the coated cores 15, the dies thereof are closed by pushing them toward each other thereby to form a honeycomb structure blank of the cores 15 as shown in FIG. 7. By using dies of a suitable shape, there can be obtained a honeycomb structure blank the cross-section of which substantially corresponds to that of the dies in the closed state which may be circular or polygonal (such as tetragonal) in longitudinal section of cavity. The thus-formed honeycomb structure blank after withdrawn from the dies by opening them, is then fired at a temperature at which the slurried ceramics-forming material can be fully sintered to form a honeycomb structure. The honeycomb structure so obtained may be machined with diamond cutters for size finishing, if desired. If some ashes or non-sintered portions of the ceramics-forming material are loosely attached to the inner wall of the cells of the honeycomb structure, they will easily be removed from the cells by blowing compressed air therethrough.

According to this invention, a slurry of a ceramics-forming material can be coated on a suitable water-absorbent paper (such as tissue paper) wound around a core material (such as rods) in any desired thickness by varying the slurry in composition and, therefore, a very thin-walled ceramic honeycomb structure can of course be obtained. A slurry coating formed on a core material in the immersion step can further be controlled in thickness by adjusting compression force (bundling force in this case) applied to the coated core material in the arranging or bundling step. In addition, the process of this invention makes it possible to manufacture satisfactory ceramic honeycomb structures only by arranging slurry-coated rods or tubes as previously mentioned prior to firing the thus-formed honeycomb structure blank without the use of nuclear or core materials together formed to a honeycomb structure blank. Thus the process of this invention is a simple and economical one for the manufacture of ceramic honeycomb structures.

As previously mentioned, the process of this invention is characterized by manufacturing thin-walled ceramic honeycomb structures having a large surface to volume ratio in a simple and economical manner. For example, the present process can manufacture a ceramic honeycomb structure having a bulk density (weight/volume) of from 0.2 to 0.8, a cell diameter or its equivalent of as small as 1.5 mm and/or a cell wall thickness of as thin as 0.05 mm. The cells of which the honeycomb structure consists, are straight ones arranged substantially in parallel with one another and may be circular, elliptical, triangular or polygonal in cross-section. By the process of this invention, there can also be manufactured ceramic honeycomb structures wherein at least two cell groups that are different from each other in cell size and/or shape are symmetrically or asymmetrically arranged. In one embodiment of this invention, rods or tubes made of combustible material are coated successively with at least two different ceramics-forming materials and the coated rods or tubes are arranged to together form a honeycomb structure blank which is then dried and fired to produce a ceramic honeycomb structure wherein the component cells have a wall composed of at least two materially different layers. For example, rods made of a combustible material are thinly and uniformly coated with a catalytic material. The coated rods are dried and further coated with a ceramics-forming material, and the doubly coated rods are together formed to a honeycomb structure blank which is then fired to produce a honeycomb structure wherein the component cells have a two-layer wall consisting of a high-strength ceramic layer as the outer one and a catalytic layer as the inner one. Likewise, there can be provided a honeycomb structure wherein the component cells have a wall comprising as the outer layer a high-strength dense ceramic one and as the inner layer a large surface-to-volume (very porous) ceramic one suitable for use as a catalyst carrier, if desired.

As is well known, ceramic honeycomb structures may be used as a light-weight structural reinforcement, heat exchange medium, catalyst carrier, catalyst support, packing material or the like. The ceramic honeycomb structures manufactured by the process of this invention are intended to be used particularly as a catalyst carrier, catalyst support or packing material. If the structures of this invention having a bulk density of about 0.2 to about 0.5 are used as a carrier for a catalyst for decontaminating exhaust gas from automobile engines, they will be advantageous in that they get hot in a short time when heated and are consequentially very superior in warming-up property because of their small heat capacity. Because of their integral structure, they do not suffer such mechanical abrasion and damage as catalyst carriers in the particulate form do. Further, they are very advantageous in that they do not substantially cause a drop in pressure of exhaust gas from automobile engines because of their large porosity.

This invention will be better understood by the following non-limitative examples.

EXAMPLE 1

Polypropylene tubes (2.5 mm in outer diameter and 300 mm in length) wound doubly with tissue paper were coated, by use of a coating machine as shown in FIG. 5, with a slurry of ceramics-forming material of the following composition:

| | |
|---|---|
| powdered alumina | 90 parts by weight |
| Gaerome clay | 10 parts by weight |
| polyvinyl acetate (conc. 50%) (in aqueous emulsion) | 15 parts by weight |
| Water | 160 parts by weight | to form on the paper-wound tubes a coating thereof of 1.0 mm in thickness and 200 mm in length. Five hundred of the thus-coated tubes were bundled so that they together formed a honeycomb structure blank having a generally circular cross section by use of a bundling machine as shown in FIGS. 6 and 7. The bundled tubes were allowed to stand at a room temperature to be dried to the extent that the coated slurry decreased to about 30 wt. percent in water content and they were then dried in a dryer at a temperature of 80°C for 15 hours. The thus-dried honeycomb structure blank was finish-cut to have a diameter of 78 mm and a length of 167 mm and then fired at 1400°C for 2 hours to obtain a cylindrical ceramic honeycomb structure 70 mm$\phi$ × 150 mm which comprised cells having a wall thickness of 0.2 mm and a cell diameter of 2.3 mm.

EXAMPLE 2

A honeycomb structure blank was prepared by following the procedure of Example 1 except that the plastics-made tubes used were polyvinyl chloride-made ones and the slurried ceramics-forming material used had the following composition:

| | |
|---|---|
| powdered zirconia | 95 parts by weight |
| calcium oxide | 5 parts by weight |
| polyvinyl acetate (conc. 50%) (in aqueous emulsion) | 15 parts by weight |
| CMC (carboxymethylcellulose) | 0.5 parts by weight |
| water | 160 parts by weight |

The thus-prepared blank was allowed to stand at room temperature for 24 hours to dry it, further dried in a dryer at 80°C for 15 hours and then fired to produce a cylindrical ceramic honeycomb structure of 73 mm × 150 mm wherein the component cells had a wall thickness of 0.3 mm and a cell diameter of 2.3 mm.

EXAMPLE 3

Polypropylene tubes (outer diameter 3.0 mm, length 200 mm) wound doubly with tissue paper were immersed through 150 mm of their length in and withdrawn from a slurry of the following composition:

| | |
|---|---|
| powdered aluminum hydroxide | 90 parts by weight |
| $H_3PO_4$ | 10 parts by weight |
| water | 40 parts by weight | to form a 2.0 mm thick coating thereof on the immersed portion of the tubes.

One hundred of the thus-coated tubes were together formed to a cylindrical honeycomb structure blank which was then dried in the same manner as in Example 1 and fired at 800°C to obtain a cylindrical ceramic ($\gamma$-$Al_2O_3$ type) honeycomb structure of 35 mm$\phi$ × 100 mm wherein the component cells had a wall thickness of 1.5 mm and a cell diameter of 3.0 mm.

EXAMPLE 4

Sodium hydroxide was dropwise added, under agitation, to a mixed solution comprising copper nitrate and chromium nitrate in a ratio of 1 : 1 to the extent that the resulting mixture reached pH 8.0, to produce a precipitate which was then suction filtered and thoroughly washed with water. The thus-washed precipitate was again dispersed in water in such amount that a 40% aqueous suspension thereof was obtained. The same paper wound plastics tubes as used in Example 3 were coated with said suspension, and each of the coated tubes was separately dried at a room temperature. The tubes thus covered with a mixture of copper hydroxide and chromium hydroxide powders, were each further coated with a slurry of the following composition:

| | |
|---|---|
| powdered aluminum hydroxide | 50 parts by weight |
| alumina sol (10%) | 25 parts by weight |
| silica sol (10%) | 25 parts by weight |

The further-coated tubes were bundled in the same manner as in Example 3 to form a honeycomb structure blank which was then fired to sinter the two coatings and simultaneously burn away the plastics tube bases, thereby obtaining a honeycomb structure wherein the component cells had a two-layer wall comprising both a catalytic layer of a mixture of copper oxide, chromium oxide, copper aluminate and chromium aluminate, and a carrier layer of $\gamma$-$Al_2O_3$.

EXAMPLE 5

Regular-hexagonal wooden rods wound triply with tissue paper, wherein the distance between the opposing sides of the cross section is 7.0 mm, were coated with a slurry of the following composition:

| | |
|---|---|
| powdered alumina | 90 parts by weight |
| Gaerome clay (kaolin-like mineral) | 10 parts by weight |
| polyvinyl acetate (conc. 50%) (in aqueous emulsion) | 15 parts by weight |
| powdered walnut shell (U.S. Standard 45 mesh) | 10 parts by weight |
| water | 160 parts by weight | to form an 0.5 mm thick coating thereof on the rods. Thirty-three of the thus-coated rods were bundled so that they together formed a honeycomb structure blank having a rectangular cross section. The blank was allowed to stand at a room temperature to be dried to the extent that an about 30% water content thereof was reached, further dried in a dryer at 80°C for 15 hours and then fired at 1400°C for 2 hours to produce a ceramic honeycomb structure of 30 mm × 50 mm × 90 mm wherein the component cells had a 3 mm thick wall and a cross section with a 6.0 mm distance between the opposing sides thereof. In addition, the ceramic honeycomb structure so obtained was characterized by containing many pores extending through the walls of any adjacent component cells of the structure.

EXAMPLE 6

In the same manner as in Example 1, the same paper-wound polypropylene tubes as used in Example 1 were coated with the same slurry as used in Example 1 and were individually dried. The dried, coated tubes were each further coated with the same slurry as above and then together formed to a honeycomb structure blank having a square cross section. The blank was further dried and then fired at 1400°C for 2 hours to obtain a regular-tetragonal ceramic honeycomb structure of 24 mm × 24 mm × 100 mm.

EXAMPLE 7

Metallic rods (2.5 mm in outer diameter and 300 mm in length) wound doubly with tissue paper were coated with the same slurry as used in Example 1 and formed to a honeycomb-like mass in the same manner as in Example 1. After drying the mass, the metallic rods were withdrawn therefrom to obtain a honeycomb structure blank. The blank was then fired at 1400°C for 2 hours thereby producing quite the same ceramic honeycomb structure as obtained in Example 1.

EXAMPLE 8

One hundred polypropylene tubes (2.5 mm in outer diameter and 100 mm in length) were each wound triply with tissue paper (0.05 mm thick), immersed in a slurry of the following composition for approximately 2 seconds and bundled, while the slurry coated was still wet and sticky, so that they together formed a honeycomb structure blank having a generally square cross section.

| Composition of the slurry | |
|---|---|
| Sillimanite powder | 66 parts be weight |
| (At least 65% of the powder: | 8$\mu$ or finer in particle size) |
| Alumina powder | 14 parts be weight |
| (At least 65% of the powder: | 8$\mu$ or finer in particle size) |
| Gairome clay | 20 parts by weight |
| Water glass | 0.5 parts by weight |
| $CaF_2$ | 1.5 parts by weight |
| Water | 35 parts by weight |

The honeycomb structure blank was allowed to stand at room temperature for 15 hours, dried at 80°C for 24 hours and finish-cut at the ends by the use of a rotary cutter to obtain a finished honeycomb structure blank 27.5 mm × 31.5 mm × 52.5 mm. The finished blank was placed in a firing oven where it was allowed to take 15 hours to be heated to 1500°C, kept at this temperature for 1 hour and then allowed to take 20 hours to be cooled to room temperature, thereby obtaining a honeycomb structure 26 mm × 30 mm × 50 mm composed of cells having a wall thickness of 0.2 mm and a cell diameter of 2.4 mm. The honeycomb structure was constituted principally of mullite.

EXAMPLE 9

Eight hundred polypropylene tubes (2.5 mm in outer diameter and 170 mm in length) were each wound triply with tissue paper (0.05 mm thick) and coated with a slurry of the following composition by the use of sponge rollers in the same manner previously indicated.

| Composition of the slurry | |
|---|---|
| Alumina | 22 parts by weight |
| (At least 60% thereof: | 8μ or finer in particle size) |
| Talc | 43 parts be weight |
| (At least 60% thereof: | 8μ or finer in particle size) |
| Gairome clay | 35 parts by weight |
| CN₁ (A 50% emulsion of polyvinyl acetate in water) | 5 parts by weight |
| Water glass[Sodium silicate (Na₂SiO₃)] | 0.5 parts by weight |
| Water | 36.5 parts by weight |

The thus-coated tubes, while the slurry coated was still wet and consequentially sticky, were treated in the same manner as previously mentioned to form a cylindrical honeycomb structure blank. The blank was allowed to stand at room temperature for 15 hours, dried at 80°C for 48 hours and then finish-cut at the ends with a rotary cutter to obtain a finished honeycomb structure blank 84 mmφ × 78 mm which was placed in a firing oven to be heated to 1300°C and kept at this temperature for 2 hours, thereby obtaining a honeycomb structure composed of cells having a wall thickness of 0.3 mm and a wall diameter of 2.3 mm.

EXAMPLE 10

One hundred polypropylene tubes (2.5 mm in outer diameter and 100 mm in length) were each wound triply with tissue paper (0.05 mm thick), dipped in a slurry of the following composition for 2 seconds, withdrawn from the slurry and then arranged to together form a honeycomb structure blank having a generally square cross section.

| Composition of the slurry | |
|---|---|
| Petalite | 80 parts by weight |
| (At least 60% thereof: | 8μ or finer in particle size) |
| Gairome clay | 20 parts by weight |
| CN₁ (A 50% emulsion of polyvinyl acetate in water) | 10 parts by weight |
| Water glass (Na₂SiO₃) | 0.5 parts by weight |
| Water | 50 parts by weight |

The blank was dried and finish-cut in the same manner as in Example 8, placed in a firing oven to be heated to 1250°C and kept at this temperature for 2 hours, and, after cooled, withdrawn from the oven thereby obtaining a honeycomb structure composed of cells having a wall thickness of 0.3 mm and a cell diameter of 2.5 mm. The honeycomb structure was constituted mainly of spodumene.

Returning now to a general description of the present invention, the amount of water contained in the slurry should be from 25 to 60% by weight thereof to provide the slurry with suitable fluidity as the coating material since the use of the slurry having such content of water in combination with the water-absorbent paper wound around the core material, is very effective in the formation of a uniform coating of the slurry and in the easy removal of the core material (in cases where non-combustible core material is used) from the coating, thereby facilitating the coating operation.

The dried blank may be heated to its sintering temperature at a heating rate of not higher than approximately 80°C per hour before reaching a temperature of approximately 400°C and then at a heating rate of not higher than approximately 120°C per hour after having been heated to the aforementioned temperature of approximately 400°C.

What is claimed is:

1. A process for the manufacture of a ceramic honey comb structure which comprises the steps of:
   a. providing combustible rods or tubes of difficult to get wetted material selected from the group consisting of plastics, wood and paper,
   b. applying water-absorbent paper to said combustible rods or tubes having a desired cross sectional shape,
   c. coating said paper applied, combustible rods or tubes individually with at least one kind of a ceramics-forming material in slurry from having a water content from about 25% to about 60% by weight to form at least one layer thereof on the paper-applied rods or tubes,
      (I) said ceramics-forming material consisting essentially of at least one member selected from the group consisting of aluminosilicate, alkaline earth metalsilicates, sillimanite, magnesium silicate, magnesia, zircon, zirconia, petalite, spodumene, cordierite, corundum, mullite, aluminum phosphate, spinel, carborundum and glass-ceramics;
   d. said paper on said rods or tubes being effective to form a uniform coating of ceramic material on said paper-applied, combustible rods or tubes,
   e. arranging at least two of the coated, paper-applied rods or tubes so that they contact with each other and together form a desired honeycomb structure blank;
   f. drying the blank; and then
   g. heating the dried blank to its sintering temperature in an oxidizing atmosphere to make it sintered and simultaneously burn away the base combustible rods or tubes and the base, water-absorbent paper thereby manufacturing the ceramic honeycomb structure.

2. A process according to claim 1, wherein the ceramics-forming material includes as a flux a member selected from the group consisting of feldspar, talc and limestone, and as a sticking agent a member selected from the group consisting of carboxymethylcellulose, polyvinyl acetate and polyvinyl alcohol.

3. A process according to claim 1, wherein the dried blank is heated to its sintering temperature at a heating rate of not higher than approximately 80°C/hr before being heated to approximately 400°C and then at a heating rate of not higher than approximately 120°C/hr after having been heated to said approximately 400°C.

4. A process according to claim 1 wherein between the steps of coating said rods or tubes and forming said honeycomb structure blank, the following steps are included: drying each of said coated rods or tubes, and further coating each of the dried coated rods or tubes with a ceramic forming material in slurry form.

5. A process for the manufacture of a ceramic honeycomb structure which comprises the steps of:
   a. providing incombustible rods or tubes,
   b. applying water-absorbent paper to said incombustible rods or tubes having a desired cross-sectional shape,
   c. coating said paper-applied incombustible rods or tubes individually with at least one kind of a ceramics-forming material in slurry form having a water content from about 25% to about 60% by weight to form at least one layer thereof on the paper-applied rods or tubes, said ceramics-forming material consisting essentially of at least one member selected from the group consisting of aluminosilicate, alkaline earth metalsilicates, sillimanite, magnesium silicate, magnesia, zircon, zirconia, petalite, spodumene, cordierite, corundum, mullite, aluminum phosphate, spinel carborundum and glass-ceramics.

d. said paper on said rods or tubes being effective to form a uniform coating of ceramic material on said paper-applied, incombustible rods or tubes, e. arranging at least two of the coated, paper-applied rods or tubes so that they contact with each other and together form a desired honeycomb-like mass;

f. drying the mass and removing therefrom the base incombustible rods or tubes without damaging the mass to obtain a desired honeycomb structure blank; and then g. heating the dried blank to its sintering temperature to make it sintered thereby manufacturing the ceramic honeycomb structure and simultaneously burn away the water-absorbent paper.

6. A process according to claim 5, wherein the ceramics-forming material includes as a flux a member selected from the group consisting of feldspar, talc and limestone, and as a sticking agent a member selected from the group consisting of carboxymethylcellulose, polyvinyl acetate and polyvinyl alcohol.

7. A process according to claim 5, wherein the dried blank is heated to its sintering temperature at a heating rate of not higher than approximately 80°C/hr before being heated to approximately 400°C and then at a heating rate of not higher than approximately 120°C/hr after having been heated to said approximately 400°C.

8. A process according to claim 5 wherein between the steps of coating said rods or tubes and forming said honeycomb-like mass, the following steps are included: drying each of said coated rods or tubes, and further coating each of the dried coated rods or tubes with a ceramic forming material in slurry form.

9. A process according to claim 1 wherein said step of arranging at least two of the coated, paper-applied rods or tubes so that they contact each other comprises confining a plurality of said coated, paper-applied rods or tubes within a confined area corresponding to the configuration of the desired honeycomb structure.

10. A process according to claim 9 wherein said confining step comprises applying a compressive force to said plurality of coated, paper-applied rods in said confined area.

11. A process according to claim 5 wherein said step of arranging at least two of the coated, paper-applied rods or tubes so that they contact each other comprises confining a plurality of said coated, paper-applied rods or tubes within a confined area corresponding to the configuration of the desired honeycomb structure.

12. A process according to claim 11 wherein said confining step comprises applying a compressive force to said plurality of coated, paper-applied rods in said confined area.

* * * * *